Figure 1:
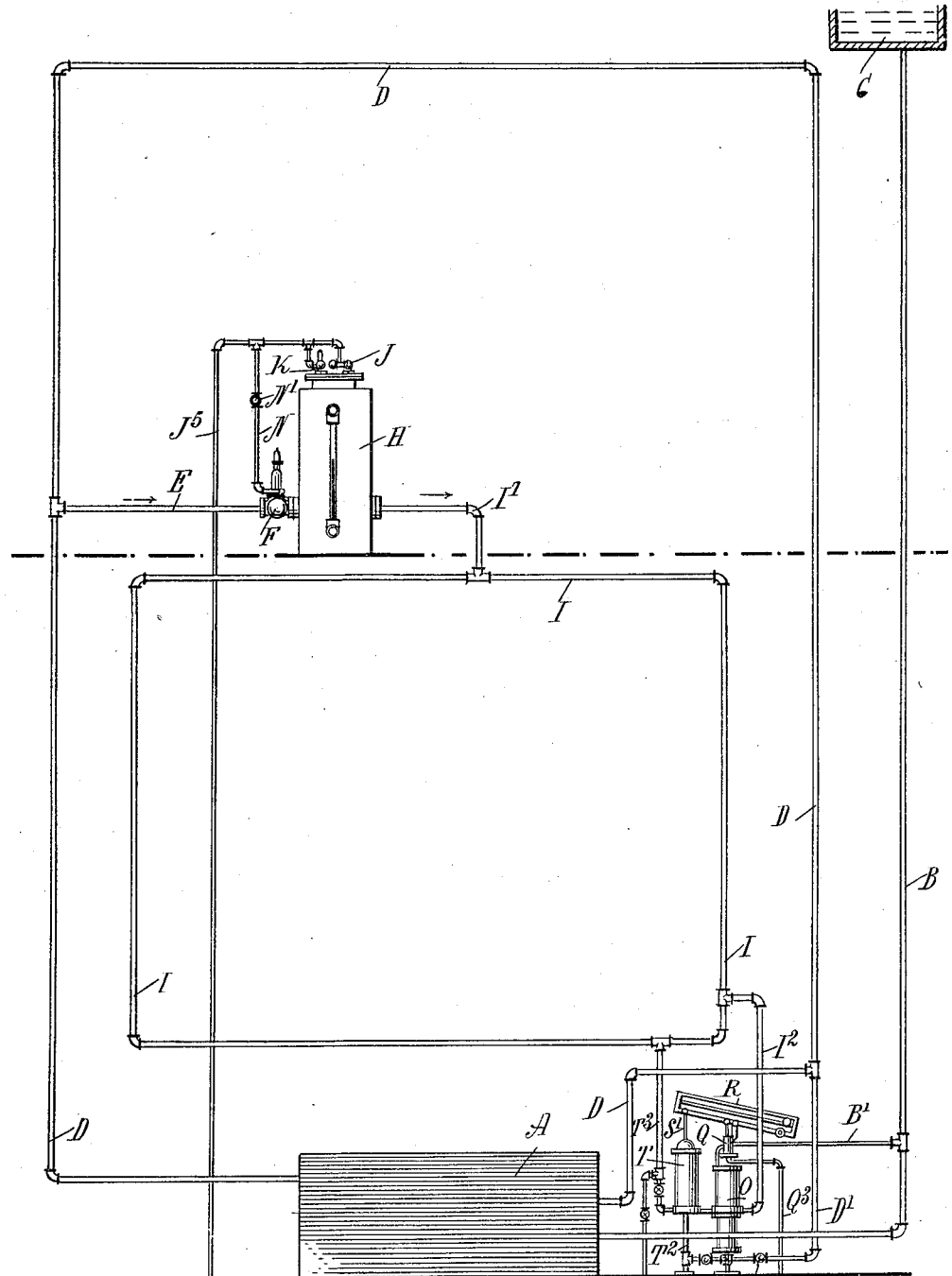

T. B. FORD.
WATER PRESSURE REDUCING AND CIRCULATING APPARATUS.
APPLICATION FILED SEPT. 27, 1911.

1,121,488.

Patented Dec. 15, 1914.

3 SHEETS—SHEET 1.

WITNESSES

INVENTOR
Thomas B. Ford
BY
ATTORNEYS

T. B. FORD.
WATER PRESSURE REDUCING AND CIRCULATING APPARATUS.
APPLICATION FILED SEPT. 27, 1911.
1,121,488.
Patented Dec. 15, 1914.
3 SHEETS—SHEET 2.
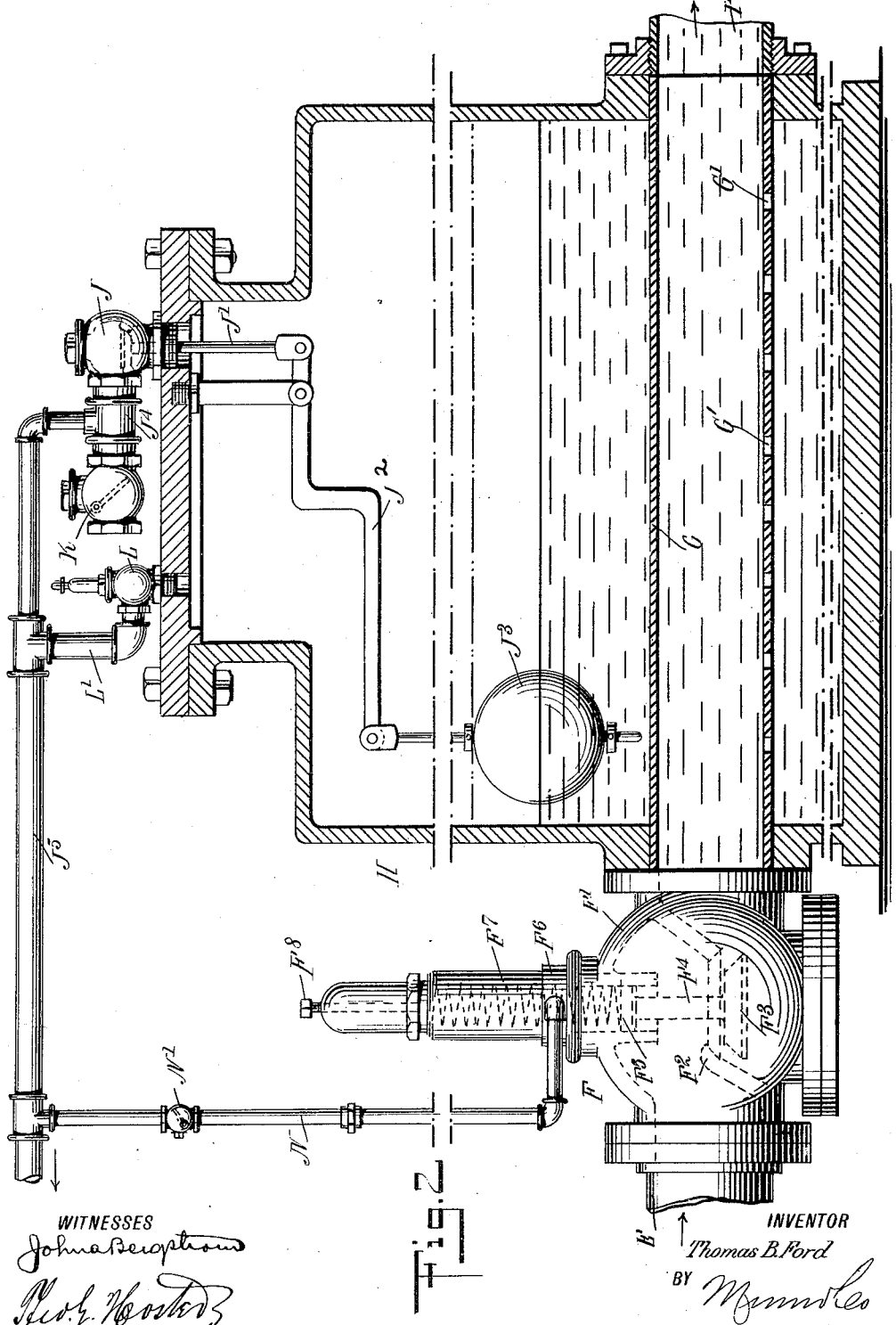
WITNESSES
INVENTOR
Thomas B. Ford
BY
ATTORNEYS

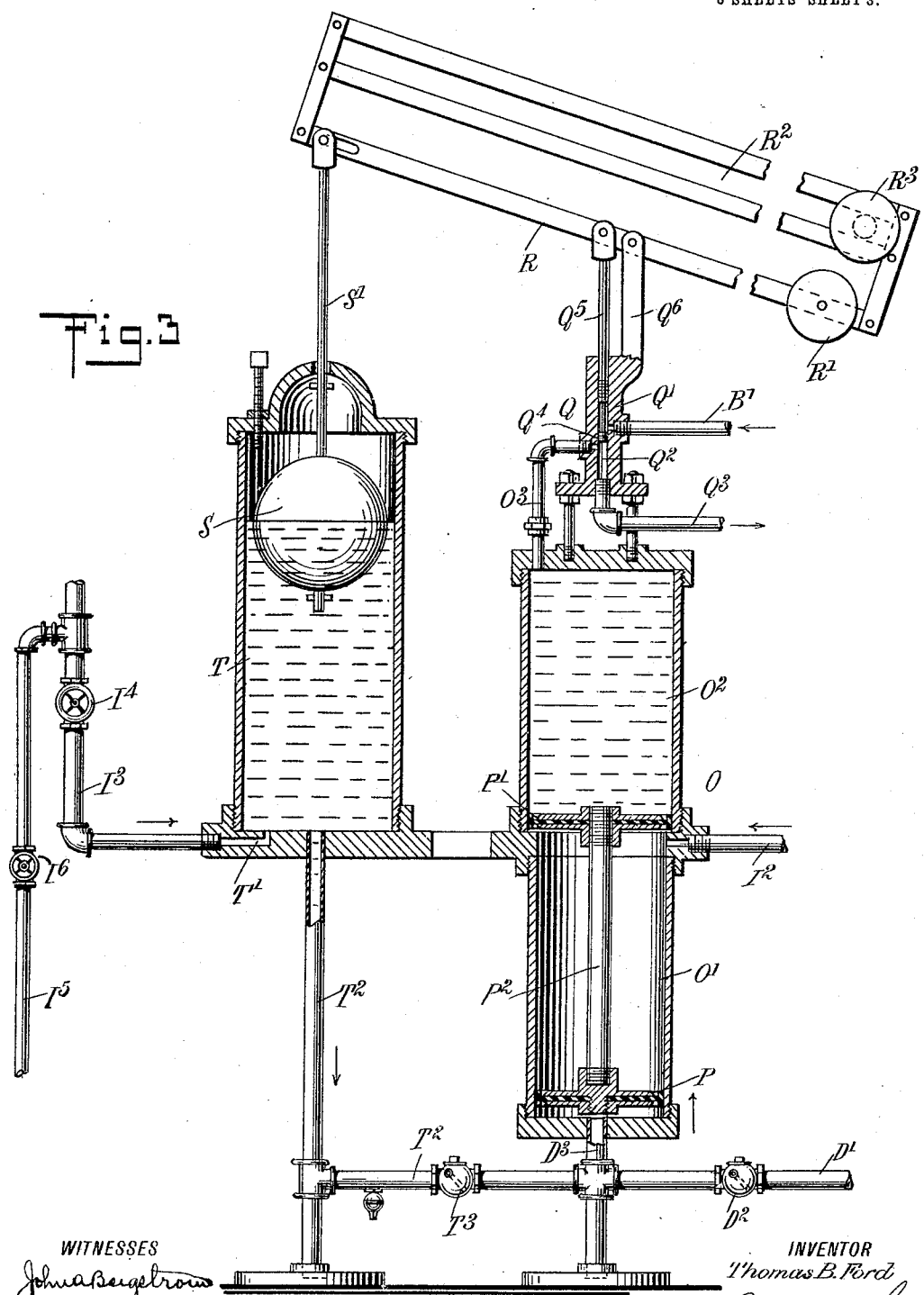

UNITED STATES PATENT OFFICE.

THOMAS B. FORD, OF NEW YORK, N. Y.

WATER-PRESSURE REDUCING AND CIRCULATING APPARATUS.

1,121,488. Specification of Letters Patent. Patented Dec. 15, 1914.

Application filed September 27, 1911. Serial No. 651,513.

*To all whom it may concern:*

Be it known that I, THOMAS B. FORD, a citizen of the United States, and a resident of the city of New York, borough of Brooklyn, in the county of Kings and State of New York, have invented a new and Improved Water Pressure Reducing and Circulating Apparatus, of which the following is a full, clear, and exact description.

The object of the invention is to provide a new and improved water pressure reducing and circulating apparatus more especially designed for use in tall buildings and arranged to reduce the high water pressure to an adequate service pressure and to insure a proper circulation of the water.

For the purpose mentioned use is made of a closed tank having a high pressure inlet and a reduced pressure outlet, a reducing valve in the said inlet and a float-controlled air intake valve on the said tank and adapted to close on the water rising to a predetermined level in the tank, the water on a further inflow compressing the air confined in the tank until the air pressure equalizes the pressure to which the said reducing valve is set to close the latter.

A practical embodiment of the invention is represented in the accompanying drawings forming a part of this specification, in which similar characters of reference indicate corresponding parts in all the views.

Figure 1 is a side elevation of the water pressure reducing and circulating apparatus; Fig. 2 is an enlarged sectional side elevation of the water pressure reducing device; and Fig. 3 is an enlarged sectional side elevation of the water-circulating device.

As illustrated in Fig. 1, a heater A of any approved construction is located in the basement of a tall building and is connected by a pipe B with a roof tank C supplied with water in any suitable manner for filling the heater A. The heater A is also connected with a high pressure circulating pipe system D connected by a branch pipe E with a reducing valve F connected with a pipe G extending through a closed tank H and having perforations G' for filling the tank H with water, as hereinafter more fully described, the end of the pipe G being connected by a branch pipe I' with a low pressure circulating pipe system I.

The tank H (see Fig. 2) is provided on the top with an air intake valve J having its valve stem J' extending into the tank H to connect with a lever $J^2$ carrying a float $J^3$ adapted to rise and fall with the water rising and falling in the tank H. When the water in the tank H falls the air intake valve J is opened by the falling float $J^3$ to allow air to pass into the tank H, and when the water rises in the tank H to a predetermined level then the float $J^3$ in rising causes a closing of the valve J so that the air is trapped within the tank H, and on a further inflow of water into the tank H the trapped air is compressed to a point to which the reducing valve F is set, so that the latter closes automatically. The inlet pipe $J^4$ for the air intake valve J is provided with a check valve K which allows ingress of the air but prevents the outflow of water in case the air intake valve is disarranged and the tank H completely fills with water.

In order to provide an overflow for an excess of water, the pipe $J^4$ is connected intermediate the valves J and K with an overflow pipe $J^5$ extending down to the sewer or other place of discharge. The top of the tank H is further provided with a relief valve L, of any approved construction set to a pressure somewhat in excess of that to which the reducing valve F is set, so that in case of derangement of the reducing valve F the valve L opens on an excess of pressure and the water can flow through the relief valve L and its outlet L' into the overflow pipe $J^5$ with which the said outlet L' is connected.

The reducing valve F is arranged as follows: The valve body F' of the reducing valve F is provided with a valve seat $F^2$, on which is adapted to be seated a valve $F^3$ connected by a stem $F^4$ with a piston $F^5$ mounted to slide in a casing $F^6$ attached to or forming part of the valve body F'. A spring $F^7$ presses on the piston $F^5$ and the tension of the spring $F^7$ can be regulated by a screw $F^8$ screwing in the top of the casing $F^7$.

It will be noticed that the water under pressure from the pipe E in passing through the pipe E into valve body F' exerts a pressure on the under side of the piston $F^5$ and on the top of the valve $F^3$ so that the valve $F^3$ readily opens to allow the water under high pressure to flow through the valve body F' into the pipe G, and from the latter through the openings G' into the tank H to fill the same, the valve J then being open. When the water in the tank H reaches a predetermined level then the valve J closes, and on a further rising of the water in the tank H, the air trapped in the tank is compressed, and when the pressure of the compressed air equals the pressure to which the reducing valve F has been set then the said valve closes owing to the preponderance of pressure against the under side of the valve $F^3$. When the water is drawn out of the tank H through the low pressure circulating pipe system I then the air pressure within the tank H is diminished, and when the water in the tank H reaches the first predetermined level then the air intake valve J again opens and likewise the reducing valve F so that water can again flow from the high pressure circulating pipe system D into the tank H.

The casing $F^6$ is provided with an overflow pipe N connected with the overflow pipe $J^5$ and having a check valve $N'$, so that in case of accident the water in the upper end of the casing $F^6$ can pass by way of the pipe N into the overflow pipe $J^5$.

By having the perforated pipe G extending through the tank H to fill the same and to connect the reducing valve F with the low pressure circulating pipe system I, the reducing valve being open the tank H becomes a dead end in case excess of water is drawn through the perforated pipe G, that is, the water in the tank H remains undisturbed while a straight water flow is had from the pipe E through the open reducing valve F and the pipe G to the branch pipe $I'$ of the low pressure circulating pipe system I. As no water is drawn out of the tank H during this time it is evident that the pressure reducing device is rendered noiseless.

In order to circulate the water in the system, use is made of a pump O having cylinders $O'$, $O^2$ (see Fig. 3) of different diameters and opening one into the other, and in the cylinders are mounted to reciprocate the pistons P, $P'$ connected with each other by a stem $P^2$, so that the pistons move in unison. The upper end of the cylinder $O'$ is connected by a branch pipe $I^2$ with the low pressure circulating system I, and the upper end of the larger cylinder $O^2$ is connected by a pipe $O^3$ with a three-way valve Q mounted on the top of the cylinder $O^2$. The three-way valve Q is provided with a valve body $Q'$ having a bore $Q^2$ connected with the pipe $O^3$ and also connected at its lower end with a discharge pipe $Q^3$ leading to a sewer or other place of discharge, and the bore $Q^2$ is connected above the pipe $O^3$ with a branch pipe $B'$ connected with the roof tank pipe B. A valve $Q^4$ is adapted to be moved up and down in the bore $Q^2$ to either connect the pipes $B'$ and $O^3$ with each other, or the pipes $O^3$ and $Q^3$. The stem $Q^5$ of the valve $Q^4$ is connected with a lever R fulcrumed on a bracket $Q^6$ forming part of the valve body $Q'$, and the lever R is pivotally connected with the stem $S'$ of a float S rising and falling in a vessel T, provided at its bottom with a small port $T'$ connected with a branch pipe $I^3$ of the low pressure circulating pipe system I. The pipe $I^3$ is provided with a valve $I^4$ and is connected above this valve with a discharge pipe $I^5$ having a valve $I^6$ and leading to a sewer or other place of discharge. Normally the valve $I^6$ is closed while the valve $I^4$ is opened, but when it is desired to drain the low pressure circulating pipe system I then the valve $I^4$ is closed and the valve $I^6$ is opened.

From the bottom of the vessel T leads a pipe $T^2$ provided with a check valve $T^3$ and connected with a branch pipe $D'$ forming part of the high pressure circulating pipe system D. The pipe $D'$ is provided with a check valve $D^2$, and the pipes $D'$ and $T^2$ are connected by a pipe $D^3$ with the lower end of the cylinder $O'$ of the pump O.

The lever R, previously mentioned, is provided with a fixed weight $R'$ and with a guideway $R^2$ on which is adapted to travel a movable weight $R^3$ to insure quick action of the lever R when the latter reaches an inclined position and the weight $R^3$ travels from one end of the guideway $R^2$ to the other end thereof.

When the several parts are in the position shown in Fig. 3, the vessel T has gradually filled with water from the low pressure circulating pipe system I, so that the float S has imparted a swinging motion to the lever R to move the valve $Q^4$ in position to connect the pipe $O^3$ with the pipe $Q^3$. Now water passing through the branch pipe $I^2$ from the low pressure circulating pipe system I into the cylinder $O'$ causes an upward movement of the pistons P, $P'$ owing to the larger area of the piston $P'$ against which the water presses relative to the smaller area of the piston P. During the upward movement of the connected differential pistons P, $P'$ the water contained in the vessel T is drawn out by way of the pipes $T^2$ and $D^3$ into the lower end of the cylinder $O'$, it being understood that the check valve $D^2$ is closed during this movement owing to the preponderance of pressure in the pipe D. When water is drawn out of the vessel T as described, the float S falls in the said vessel and thus imparts a swinging motion to the lever R so that the valve $Q^4$ is moved downward to finally connect the pipes $O^3$ and $B'$ with each other and to cut off the pipe $Q^3$. Water from the roof tank C can now pass by way of the pipes B and $B'$, bore $Q^2$ and the pipe $O^3$ into the upper end of the cylinder $O^2$ to force the piston $P'$ downward so that the piston P forces out the water in the lower end of the cylinder O', the forced out water passing through the pipe D³ into the pipe D' and into the high pressure circulating pipe system D, it being understood that during this movement the check valve T³ is closed while the check valve D² is open.

The above described operation is repeated on the refilling of the tank T with water from the low pressure circulating pipe system I, whereby the float S is raised, the valve Q⁴ is lifted to disconnect the pipes B' and O³ and to connect the pipe O³ with the pipe Q³ for the discharge of the water from the cylinder O² by way of the pipe O³, bore Q² and the pipe Q³ on the next upward movement of the connected pistons P and P'.

From the foregoing it will be seen that the water from the low pressure circulating pipe system I is returned to the high pressure circulating pipe system D.

Having thus described my invention, I claim as new and desire to secure by Letters Patent:

1. An apparatus of the class described, comprising a service pressure tank, a tank pipe extending through said tank and connected with a low pressure circulating pipe system, said tank pipe being provided within the tank with perforations, a high pressure supply pipe connected with the other end of the tank pipe, a reducing valve in the high pressure pipe, a float controlled air intake valve for said tank, an air inlet pipe for the intake valve, a check valve in said pipe, a relief valve on the tank and set to a pressure exceeding that of the reducing valve, and an overflow pipe connected with the air inlet pipe intermediate of the intake valve and check valve, said overflow pipe being also connected with the relief valve and the reducing valve.

2. An apparatus of the class described, comprising a service pressure tank, a perforated pipe extending through the tank, a high pressure supply pipe connected with the outer end of said perforated pipe, a reducing valve in the high pressure pipe, a float controlled air intake valve for the tank, an air inlet pipe for the intake valve, a check valve in said pipe, an overflow pipe connected with the air inlet valve between the intake valve and the check valve, and a pipe leading from the reducing valve to the overflow pipe.

In testimony whereof I have signed my name to this specification in the presence of two subscribing witnesses.

THOMAS B. FORD.

Witnesses:
 THEO. G. HOSTER,
 PHILIP D. ROLLHAUS.

Copies of this patent may be obtained for five cents each, by addressing the "Commissioner of Patents, Washington, D. C."